US012056750B2

(12) United States Patent
Donnels et al.

(10) Patent No.: US 12,056,750 B2
(45) Date of Patent: Aug. 6, 2024

(54) SYSTEM, COMPUTER STORAGE MEDIA, AND METHOD FOR INTELLIGENT COMPUTER SEARCH FUNCTIONALITY FOR LOCATING ITEMS OF INTEREST NEAR USERS

(71) Applicant: eBay Inc., San Jose, CA (US)

(72) Inventors: Magdalena Donnels, San Jose, CA (US); Rajesh Nanoo, Bellevue, WA (US); Raphael Philip Tsing Tseuk Tsow, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/214,281

(22) Filed: Mar. 26, 2021

(65) Prior Publication Data

US 2022/0309557 A1     Sep. 29, 2022

(51) Int. Cl.
G06Q 30/00        (2023.01)
G06Q 30/0601    (2023.01)

(52) U.S. Cl.
CPC ..... *G06Q 30/0631* (2013.01); *G06Q 30/0625* (2013.01); *G06Q 30/0639* (2013.01); *G06Q 30/0643* (2013.01)

(58) Field of Classification Search
None
See application file for complete search history.

(56) References Cited

U.S. PATENT DOCUMENTS

| 8,606,645 | B1 * | 12/2013 | Applefeld | G06Q 30/02 |
| | | | | 705/26.1 |
| 8,688,524 | B1 * | 4/2014 | Ramalingam | G06Q 30/0246 |
| | | | | 705/16 |
| 10,748,159 | B1 * | 8/2020 | Selinger | G06Q 30/02 |
| 10,839,453 | B1 * | 11/2020 | Benkreira | G06Q 30/0643 |
| 11,010,707 | B1 * | 5/2021 | Kim | G06Q 10/0838 |
| 2009/0063304 | A1 * | 3/2009 | Meggs | G06Q 30/0625 |
| | | | | 705/26.62 |
| 2013/0275210 | A1 | 10/2013 | Johnson | |

(Continued)

OTHER PUBLICATIONS

Steinfield, C., Integrating brick and mortar locations with e-commerce: understanding synergy opportunities, Jan. 1, 2001, Proceedings of the 35th Annual Hawaii International Conference on System Sciences, pp. 2920-2929 (Year: 2001).*

(Continued)

*Primary Examiner* — Allison G Wood
*Assistant Examiner* — Timothy J Kang
(74) *Attorney, Agent, or Firm* — Shook, Hardy & Bacon L.L.P.

(57) ABSTRACT

Various embodiments improve existing technologies by generating one or more user interface elements or personalized pages based on determining that a set of inventory items are within a geographical vicinity (e.g., a threshold distance) of a user. In response to a determination that a particular item is within a geographical vicinity of a user, some embodiments cause display of a page (e.g., a personalized page) that identifies item and/or other information, such as an identity and address of the local retailers that offer the item for sale. Such functionality can be integrated with additional functionality, such as electronic marketplace searches and item listings, and local delivery service requests, among other things.

13 Claims, 9 Drawing Sheets

(56) References Cited

U.S. PATENT DOCUMENTS

| | | | |
|---|---|---|---|
| 2013/0290106 A1 | 10/2013 | Bradley et al. | |
| 2014/0289047 A1* | 9/2014 | Yee | G06Q 30/0261 |
| | | | 705/14.58 |
| 2015/0134488 A1 | 5/2015 | Maclaurin et al. | |
| 2016/0127899 A1* | 5/2016 | Jabara | H04W 4/02 |
| | | | 455/411 |
| 2016/0180404 A1* | 6/2016 | Stern | G06Q 30/0261 |
| | | | 705/14.58 |
| 2017/0177618 A1* | 6/2017 | Hu | G06Q 10/0833 |
| 2019/0073697 A1 | 3/2019 | Varley | |
| 2020/0364773 A1* | 11/2020 | Pal | G06F 3/0484 |
| 2021/0200753 A1* | 7/2021 | Perelman | G06Q 30/0639 |

OTHER PUBLICATIONS

Partial European Search Report Received received for European Patent Application No. 22163529.5, mailed on Aug. 29, 2022, 12 Pages.

Extended European Search Report received for European Patent Application No. 22163529.5, mailed on Nov. 30, 2022, 11 Pages.

* cited by examiner

FIG. 4

SYSTEM, COMPUTER STORAGE MEDIA, AND METHOD FOR INTELLIGENT COMPUTER SEARCH FUNCTIONALITY FOR LOCATING ITEMS OF INTEREST NEAR USERS

BACKGROUND

After launching a web browser or other client application, a user typically either manually enters in a Uniform Resource Locator (URL) or provides search engine terms for each information need they have. Each individual set of information is typically rendered to the user via a single graphical user interface (GUI) or search result page. The user can also manually download or launch an application for each need they have. Users often need to resolve multiple information-based matters simultaneously or within a certain time period, which results in repetitive browser queries, web page clicks, or application downloads. For example, a user may issue, at an electronic marketplace web application, a first query for an item that returns an item listing that describes the item. If the user desires to see if any local brick-and-mortar stores sold the same item and offered delivery services, the user would have to manually enter additional URLs to navigate other pages that correspond to the brick-and-mortar stores and delivery services respectively. These repetitive user computer inputs result in increased computing resource consumption, among other things. Further, the functionality of existing electronic marketplace applications, search engines, and corresponding user interfaces is limited.

BRIEF SUMMARY

Particular embodiments of the present disclosure include a computer-implemented method, a non-transitory computer storage medium, and a system. Some aspects are directed to improving existing electronic marketplace applications, search engines, and corresponding user interfaces by generating one or more user interface elements or personalized pages based on determining that a set of items are within a geographical vicinity (e.g., a threshold distance) of a user. In operation, some embodiments identify one or more interest signals of a user. For example, embodiments can automatically predict (e.g., via a machine learning model) that a user has interest in one or more items based on past searches, current queries, and/or other computer input. Based on the one or more interest signals, some embodiments determine that one or more particular items (or a particular retailer store that carries the items) are within a geographical vicinity of the user or user device associated with the user. In response to such determination that the particular items are within the geographical vicinity, some embodiments cause display of a page (e.g., a personalized page) that identifies the items and/or other information, such as an identity and address of the local retailers that offer the items for sale. Such functionality can be integrated with additional functionality, such as electronic marketplace searches and item listings, and local delivery service requests, as described in more detail herein. All of this functionality not only improves upon the functionality of these existing technologies, but improves the user experience and computing resource consumption (e.g., disk I/O) relative to other technologies, as described in more detail herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 4 is a screenshot of an example user interface, according to some embodiments.

DETAILED DESCRIPTION

Figure 1:
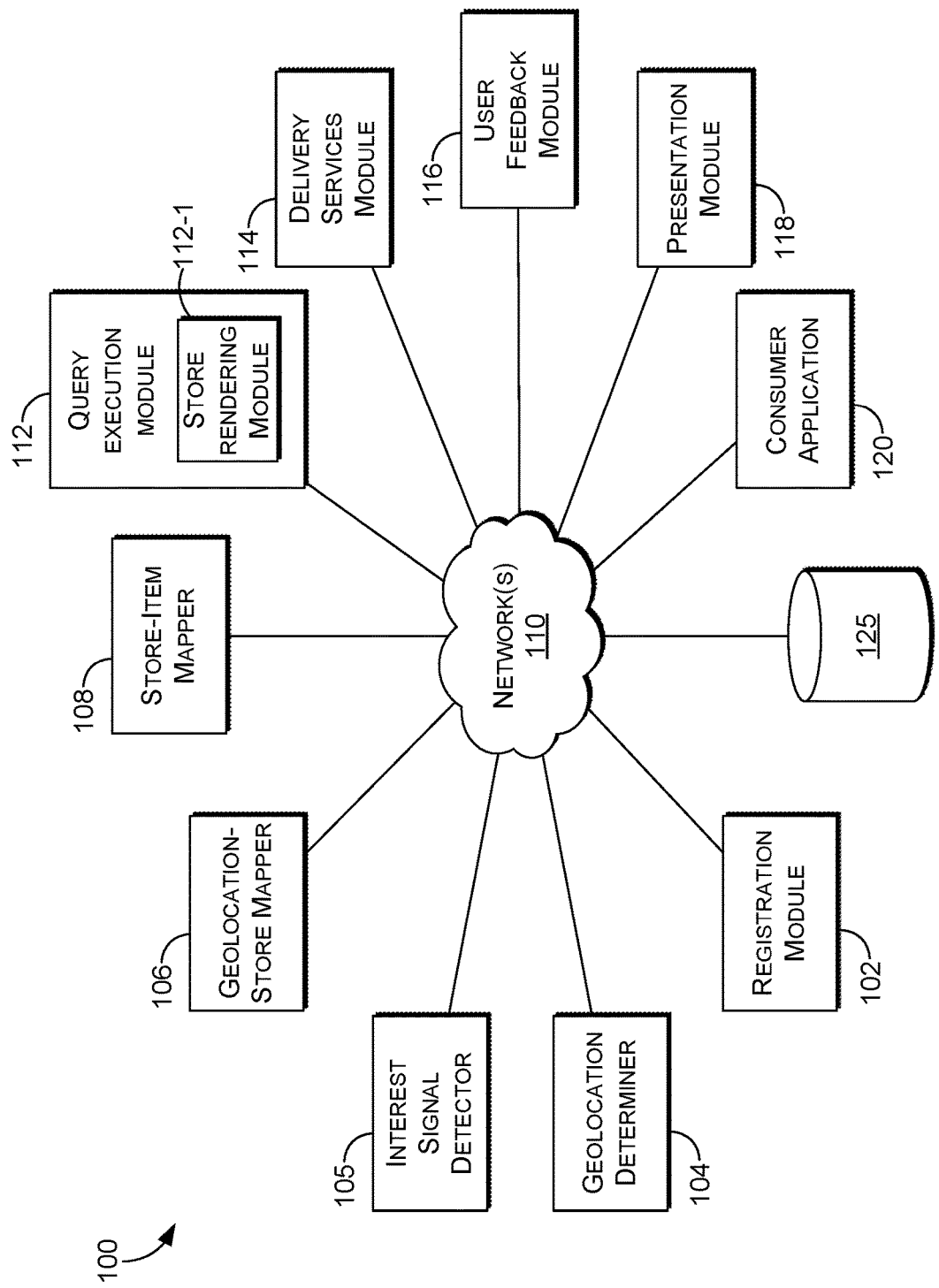
FIG. 1 is a block diagram of an illustrative system architecture in which some embodiments of the present technology may be employed, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As indicated above, existing applications, such as electronic marketplace applications, and search engines have limited functionality. For instance, although typical existing electronic marketplaces and search engines execute queries for search and retrieval (e.g., via Term Frequency Inverse Document Frequency (TF-IDF)) for items, they do not include functionality for adequately rendering search results of retailers local to the user that offer the queried item for sale. This negatively affects the user experience because these technologies fail to render a complete view of all items that are part of a query. Existing electronic marketplace applications also do not adequately integrate information from other remote resources, such as geo-location services and delivery services in order to, for example, render search results based on a location of the user and seamlessly deliver the item to the user.

Existing technologies also consume an unnecessary quantity of computing resources (e.g., I/O costs, network packet generation costs, throughput, memory consumption, etc.). As described above, users often need to resolve multiple information-based matters simultaneously or within a certain time period, which results in repetitive browser queries, web page clicks, or application downloads. For example, at an electronic marketplace, a user may issue a first query that returns a search results page of various item listings. However, the user may not be pleased with the search results or the user may desire to further receive information about whether local retailer stores also sell the item indicated in the query. In order to receive this additional information, the user typically has to issue respective additional computer input. For instance, the user would have to open an additional window or web browser application, enter a local retailer website URL, and manually click or scroll through various pages of items to see if the local retailer store sells the item.

These repetitive inputs result in increased computing resource consumption, such as packet generation costs that adversely affect computer network communications. Each time a user issues a query (e.g., an HTTP request), for example, the contents or payload of the query is typically supplemented with header information or other metadata within a packet in TCP/IP and other protocol networks. Accordingly, when this functionality is multiplied by all the inputs needed to obtain the desired item data and local store data, there are throughput and latency costs by repetitively generating this metadata and sending it over a computer network multiple times.

In some instances, these repetitive inputs (e.g., repetitive clicks, selections, or queries) increase storage device I/O (e.g., excess physical read/write head movements on non-volatile disk) because each time a user inputs this item and store information, such as inputting several queries for items and the local stores by the user, the computing system often has to reach out to the storage device to perform a read or write operation, which is time consuming, error prone, and can eventually wear on components, such as a read/write head. Further, repetitively issue queries is expensive because processing queries consume a lot of computing resources. For example, an optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time. Most database relations contain hundreds if not thousands of records. Repetitively calculating query execution plans on this quantity of rows decreases throughput and increases network latency.

The limited functionality of these applications also includes limited user interface functionality, which negatively affects the user experience. For instance, as described above, existing electronic marketplace applications and other technologies require users to generate redundant queries, selections, and other computer input, such as drilling down several layers of pages to obtain relevant information. This may make it arduous and slower for a user to navigate through the user interface to obtain relevant information. Consequently, using these existing user interfaces is burdensome and negatively affects the user experience.

Various embodiments of the present disclosure provide one or more technical solutions to these technical problems described above, as well as other problems. In operation, some embodiments identify one or more interest signals of a user. For example, embodiments can automatically (e.g., without a query) predict (e.g., via a machine learning model) that a user has interest in one or more items based on past searches, current queries, and/or other computer input. Based on the one or more interest signals, some embodiments determine that the particular item is within a geographical vicinity of the user or user device associated with a user. For example, as a part of establishing a communication session with a user device, some embodiments automatically receive a geo-coded indicator (e.g., an IP address) that indicates the geolocation of the user device and then maps (e.g., via a hash map) the particular item that is of interest to the user to a list of retailer stores within a signal strength or distance threshold (e.g., 5 miles) that offer the item for sale. In response to such determination that the particular item is within the geographical vicinity, some embodiments cause display of a page (e.g., a personalized page) that identifies the items of interest and/or other information (e.g., an address) of the local retailers that offer the items for sale. Such functionality can be integrated with additional functionality, such as electronic marketplace searches and item listings, and local delivery service requests, as described in more detail herein.

Various embodiments improve existing applications, such as electronic marketplace applications and search engines. For instance, some embodiments include functionality for rendering search results of retailers local to the user that offer a queried item for sale. This improves the user experience because these embodiments render a complete view of all items that are part of a query—those items that exist within an electronic marketplace and those items that are also for sale locally, for example. Various embodiments also adequately integrate electronic marketplace functionality with other remote resources, such as geo-location services and delivery services in order to, for example, render search results based on a location of the user and provide a seamless way to deliver the locally-sold items to the user, which improves the user experience.

Various embodiments also improve computing resource consumption, relative to existing technologies. As described above, users often need to resolve multiple information-based matters simultaneously or within a certain time period, which results in repetitive browser queries, web page clicks, application downloads, and network traversal. However, users do not have to perform repetitive browser queries, clicks, or other computer input because all of the information the user needs can be rendered to a single user interface page. For example, electronic marketplace item listing search results, as well as the identity of all the local retailers that sell an item of interest can be rendered to a single page. In this way the user would not have to open an additional window or web browser application, enter a local retailer website URL, and manually click or scroll through various pages of items to see if the local retailer store sells the item, unlike existing technologies because all of the desired information would be rendered via a single page. Accordingly, the single page of information rendered by embodiments leads to decreased computing resource consumption, such as packet generation costs. For instance, a query (e.g., an HTTP request), would only need to traverse a computer network once (or fewer times relative to existing technologies). Specifically, the contents or payload of the query is supplemented with header information or other metadata within a packet in TCP/IP and other protocol networks once for the initial query. Such packet is only sent over the network once or fewer time after that because all of the necessary information is displayed to a single page. Thus there is no repetitive generation of metadata and continuous sending of packets over a computer network.

In like manner, some embodiments improve storage device or disk I/O and query execution functionality. This is because various embodiments go out to disk a single time (or fewer times) relative to existing technologies because these embodiments do not require the repetitive manual user inputs, unlike existing technologies. As described above, users often need to resolve multiple information-based matters simultaneously or within a certain time period, which results in repetitive browser queries, web page clicks, application downloads. This causes multiple traversals to disk relative to these embodiments. Therefore, embodiments reduce storage device I/O because the user provides only minimal inputs (e.g., an initial query) and so the computing system does not have to reach out to the storage device as often to perform a read or write operation. For example, the user can issue a single query for an item, and a single page can provide both the item listings an electronic marketplace offers for sale and the single page can additionally provide a list of all retailer stores that sell the particular item indicated in the query. Accordingly, there is not as much wear on components, such as a read/write head, because disk I/O is substantially reduced.

Various embodiments also improve query execution resource savings. Specifically, for example, an optimizer engine of a database manager module calculates a query execution plan (e.g., calculates cardinality, selectivity, etc.) on fewer queries relative to existing technologies. This increases throughput and decreases network latency because embodiments do not have to repetitively calculate query execution plans on thousands of rows because fewer queries need to be executed, unlike existing technologies.

Various embodiments improve user interface functionality, which improves the user experience. For instance, as described above, existing electronic marketplace applications and other technologies require users to generate redundant queries, selections, and other computer input, such as drilling down several layers of pages to obtain relevant information. However, embodiments can provide all the necessary information, such as electronic marketplace item listings and brick-and-mortar store identifiers that sale the same items to a single page. This makes it easier and faster for a user to navigate through the user interface to obtain relevant information.

FIG. 1 is a block diagram of an illustrative system architecture 100 in which some embodiments of the present technology may be employed, according to some embodiments. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 800 of FIG. 8). In other embodiments, the system 100 is located at a single host or computing device (e.g., the computing device 900 of FIG. 9). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to determining that there are one or more inventory facilities within a geographical vicinity of a user or user device based at least in part on identifying one or more interest signals of the user. The system 100 includes a registration module 102, a geolocation determiner 104, an interest signal detector 105, a geolocation—store mapper 106, a store—item mapper 108, a query execution module 112, a delivery services module 114, a user feedback module 116, a presentation module 118, a consumer application 118, and storage 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can be any combination of connections (e.g., APIs or linkers) or protocols that will support communications between the components of the system 100.

The registration module 102 is generally responsible for registering a user by generating an account of the user based on various information being input by the user. For example, the registration module 102 can receive various user inputs, such as the user's address, username, password, billing information, and the like. In some embodiments, the registration module 102 represents "offline" (e.g., non-runtime) activities that occur before user queries are executed.

In some embodiments, the registration module 102 alternatively or additionally includes other user input, such as inventory facility or physical retailer location preferences that the user regularly shops at or otherwise prefers to shop at. An "inventory facility" as described herein, refers to any physical or tangible (i.e., not electronic or virtual (e.g., e-commerce platform)) facility that houses, carries, or offers for sale items that the user may purchase. For example, an inventory facility may include a physical retailer location, wholesaler, access point, locker, a tent or stand where goods are sold and the like. A "physical retailer location" as described herein refers to any physical or tangible brick-and-mortar facility or building structure of a retailer. A retailer or merchant is an entity that sells goods directly to consumers, usually through various distribution channels (e.g., it buys products from a manufacture or whole seller to sell directly to customers). For example, a physical retailer location can include a grocery store, a drug store, a mall, a book store, and the like.

In some embodiments, the registration module 102 additionally or alternatively receives other user registration information, such as user preferences of items or item types (e.g., NIKE shoes), additional account information, such as social media account and e-commerce account information (e.g., password and username information and photographs of the user), and ranking criteria (e.g., criteria for ranking search results), as described in more detail below. In some embodiments, some or all of the information registered by the registration module 102 is used to create a personalized page for a buyer, as described in more detail below.

The geolocation determiner 104 is generally responsible for determining the physical location of a user and/or user device associated with the user. In some embodiments, such determination is made in order to determine one or more inventory items or physical retailer locations that are within a geographic vicinity of a user, as described in more detail below. In some embodiments, the geolocation determiner 104 determines the physical location of a user by programmatically calling or communicating with the registration module 102 to determine what residential or business address information the user has input at registration time that indicates the user's location.

Alternatively or additionally, in some embodiments the geolocation determiner 104 determines the location of a user device as a part of or in response to establishing a communication channel or session. For example, when a user device establishes a communication session (e.g., via a SYN, ACK, and SYN-ACK handshakes) with an electronic marketplace server, a geocoded indicator, indicating the user's geographical location, can be passed in a TCP/IP packet to the electronic marketplace server. Alternatively or additionally, an IP address of the user device, which indicates the geographical location, can be transmitted to the electronic marketplace server. Alternatively or additionally, a GPS module located at a user device can pass the user device's geo-coordinates to the electronic marketplace server.

In some embodiments, the geolocation determiner 104 acquires information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user device's position in connection with a variety of other systems, including cellular towers, Wi-Fi access points, and/or the like. Similarly, the user device may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The interest signal detector 105 is generally responsible detecting one or more interest signals of a user. An "interest signal" as described herein, refers to information or data that is indicative of one or more interests (e.g., items or stores) of a user. For example, an interest signal can be a document that indicates a plurality of user activity that contains a frequency of clicks of an item listing over a threshold. These high frequency of clicks over a threshold (e.g., 30-40) may indicate that the user is interested in the corresponding item. "User activity" can include any type of computerized computer input, such as a click, view, buy, bid, skip, and the like, of an item listing.

Detecting an interest signal can occur in any suitable manner. For example, in some embodiments, the interest signal detector 105 detects user interests by programmatically calling or communicating with the registration module 102 in order to obtain each item, or other information, the user likes or is interested in. Alternatively or additionally, the interest signal detector 105 detects user interest by detecting, in near real-time, that a user has issued any query request for any item for sale in an electronic marketplace. For example, the identifying of the one or more interest signals can occur in response to receiving a query request for a first item for sale in an electronic marketplace. Accordingly, the interest signal detector 105 can detect that the user is interested in the first item.

As described above, in some embodiments, the interest signal detector 105 detects interest signals based on an aggregated history of multiple user inputs (not just one), such as a click frequency, buy frequency, and the like. For example, the interest signal detector 105 can determine an interest signal for an item if the user engages in user activity (e.g., clicks) over some threshold (e.g., 30 clicks). Likewise, in some embodiments, the interest signal detector 105 uses one or more machine learning models to detect interest signals of a user. Machine learning models (e.g., a deep neural network) are more likely to capture hidden or latent patterns or relationships of past user activity or other data that is indicative of a user interest signal. For example, machine learning models may predict that the user likes or will purchase a red hat based on recent past purchases of red pants and a red shirt, and older past purchases of multiple hats.

In some embodiments, the interest signal detector 105 detects interests of a user by performing or using image processing or object detection via one or more images (e.g., scraped from a user device). For example, some embodiments use a Convolutional Neural Network (CNN) in order to detect objects in several pictures a user has uploaded. These embodiments can determine a pattern of detected objects, such as boats and lakes. Accordingly, embodiments can detect that the user likes boats or the outdoors.

The geolocation—store mapper 106 is generally responsible for mapping the location of the user or use device associated with the user to the inventory items, inventory facilities or physical retailer locations that are within some threshold (e.g., an RSSI or distance threshold) of the user or user device. Such mapping can occur through any suitable data structure (e.g., hash table) and/or calling or communication functionality. For example, the geolocation store mapper 106 can programmatically call or communicate with the geolocation determiner 104 to determine the user device's current location. Alternatively or additionally, the geolocation store mapper 106 can programmatically call or communicate with the registration module 102 to obtain the user's address information. Additionally, the geolocation—store mapper 106 can determine which inventory facilities or physical retailer locations are within a threshold distance (e.g., 5 miles) of the user device's or user's location. Alternatively or additionally, the geolocation—store mapper 106 can programmatically call or communicate with the registration module 102 to see if such inventory facilities or physical retailer locations were indicated by the user at registration time. If they were, they are candidates to purchase an item from (or candidates to render to a page for a user to consider purchasing from). If not, in some embodiments they are deleted or removed from being a candidate to purchase an item from. Alternatively, in some embodiments, the geolocation—store mapper 106 programmatically calls or communicates with the registration module 102 to consider all inventory facilities or physical retailer locations as candidates to purchase an item from.

In some embodiments, the geolocation—store mapper 106 is additionally or alternatively responsible for determining that there are a plurality of inventory items within a geographical vicinity of the user (e.g. based at least in part on one or more interest signals of a user). A "geographical vicinity" as described herein refers to a threshold (e.g., predetermined) distance, and/or a signal strength threshold or communication range (e.g., an RSSI range) between two or more devices. In some embodiments determining that one or more inventory items are within a geographical vicinity of the user occurs directly. Accordingly, each inventory item may have a tag (e.g., an RFID tag or NFC tag), a beacon, or radio and a user device can, for example, establish a near-field or other communication with such tag, beacon, or radio when the two devices are within some threshold range (e.g., RSSI range). As part of this communication, an identifier indicating the identity or ID of the inventory items (and/or user device) can be transmitted so that the user can be identified, as well as the particular inventory items that are within the geographical vicinity of the user device. Accordingly, when, for example, a personalized page is presented with inventory items based on the geographical vicinity, the identity of those inventory items can be derived from the transmitted ID and provided for display on the page. Alternatively, in some embodiments, determining that one or more inventory items are within a geographical vicinity of the user can occur indirectly. For example, instead of each inventory item containing a tag, beacon, or radio, a physical retailer location itself can include the tag, beacon, or radio. Accordingly, the user device can, for example, establish a near-field communication with such tag, beacon, or radio when the two devices are within a threshold range, as described above. In this way, instead of directly determining that there are specific inventory items within a geographical vicinity of the user, it is directly determined that there are specific physical retailer locations (that carry the specific inventory items) that are within a geographical vicinity of the user.

The store—item mapper 108 is generally responsible for mapping the one or more inventory facilities or physical retailer locations indicated by the geolocation store mapper 106 to one or more items (and/or other item information, such as price) to determine if the inventory facilities or physical retailer locations offer for sale, have in stock, or otherwise hold the one or more items. In some embodiments, such one or more items are those detected to be of interest by the interest signal detector 105. For example, the store—item mapper 108 may first programmatically call or communicate with the interest signal detector 105 to determine that the user is interested in a first item. The store—item mapper 108 may then programmatically call or communicate with the geolocation store mapper 106 to determine which suitable inventory facilities or physical retailer locations are within a threshold distance of the user device or user. Responsively, the store—item mapper 108 can determine if such inventory facilities or physical retailer locations have such items of interest in stock (or for sale) at the inventory facilities. For example, the store—item mapper 108 can establish a communication session with a retailer server, and the retailer server can access, via a specialized API, a database of inventory information in near real-time to determine if the item of interest is currently in stock (or for sale) and the particular prices that the items are offered for sale at. This information can then be passed back, through the API, to a host and subsequently back to the store—item mapper 108 so that this component can map the inventory facility to the item (e.g., if the item is in stock or for sale).

In some embodiments the query execution module 112 is generally responsible for executing queries to return item listings as search results to users. In some embodiments, an "item listing" as described herein refers to a description (e.g., in natural language) and/or indication (e.g. a photograph) of an item that is for sale in an electronic marketplace. For example, the item listing can include an image that represents an item for sale and an item title that summarizes key attributes of the item for sale, such as a name and price of an item. An "item" or "inventory item" is the tangible real world product or good and/or service that is for sale (e.g., at an electronic marketplace and/or physical retailer location). Alternatively or additionally, an item listing refers to a document, file, link, web page, identifier, or any search result that indicates the item listing's source (e.g., a URL in a web browser search engine).

An "electronic marketplace" as described herein refers to any mobile app, web application (e.g., an e-Commerce web application), or any suitable computer application that includes functionality for executing users' requests or queries to purchase one or more items. In some embodiments, an electronic marketplace facilitates consumer-to-consumer transactions (e.g., private seller to private buyer). Alternatively or additionally, the electronic marketplace facilities business-to-consumer transactions. In some of these embodiments, entities (e.g., corporations) may provide item listings describing items on their website for consumer purchase without letting private sellers sell items. It is understood that an electronic marketplace need not refer to the entire or main functionality of a given application. Rather, an electronic marketplace can refer to a particular set of routines, functions, or portion of a larger application. For example, a web application may correspond an education web application that allows users to sign up for classes, while at the same time including an electronic marketplace to purchase items (e.g., books).

In an illustrative example of the query execution module 112, it can receive a user request for an item listing that indicates a first item. In response to receiving the user request, the query execution module 112 can cause presentation of the item listing as a search result on a search results page to execute the user request. In some embodiments, the query execution module 112 includes a query processor that is responsible for executing a query (e.g., via query optimizer, selectivity, and cardinality) at runtime in order to rank and render search results according to the query. The search query processor can rank item listings (and/or inventory facilities) as search results based on terms in a query. Any suitable search engine functionality may be employed for ranking. For example, algorithms used by the query processor may be or include: TF-IDF, WORD2Vec, PageRank (PR) algorithm, and the like.

In some embodiments, the query execution module 112 additionally or alternatively renders (e.g., via the store rendering module 112-1 and the presentation module 118) one or more inventory facilities determined by the geolocation—store mapper 106 and/or the store—item mapper 108 in response to a query for an item listing. For example, the store rendering module 112-1 can receive a query request for a first item. Responsively, the store rendering module 112-1 can programmatically call or communicate with the store—item mapper 108 to determine if the first item indicated in the query request is in stock and/or for sale in any of the inventory facilities. If the first item is in stock or is otherwise for sale, the store rendering module 112-1 can cause presentation of an identifier that identifies the particular inventory facility, as described in more detail below.

In some embodiments, the store rendering module 112-1 additionally ranks each inventory facility (or recommends a particular item facility) for purchasing the item indicated in the query. Such ranking can be based on any suitable criteria, such as distance to a user device or user (e.g., as determined by the geolocation—store mapper 106), user preferences, whether the item is currently in stock, the price (e.g., as determined by the store—item mapper 108) of the item at the particular inventory facilities, and/or the detected interest signals (e.g., via the interest signal detector 105). For example, the closer in distance (or RSSI signal strength) a user or user device is to an inventory facility, the higher the inventory center will be ranked. Likewise, the store rendering module 112 can programmatically call or communicate with the registration module 102 to determine a ranked list of physical retailer locations that the user has provided for user preferences. User preferences can additionally or alternatively and automatically (without user input) be determined based on interests indicated by the interest signal detector 105 based on, for example, determining that a user has visited a physical retailer location over some threshold quantity of times (e.g., 30).

Likewise, if the item is currently in stock at an inventory facility, the store rendering module 112-1 can rank those inventory facilities higher than those that do not have the item in stock. Likewise, the cheaper or lower in price the items are, the higher in rank the corresponding inventory facilities are. One or more of these factors can be used in isolation or in combination to aggregate a final ranking score. For example, each of these ranking factors or criteria can take on an initial value or weight that is combined with the value or weight of other factors to generate a final ranking score. For instance, based on the inventory facility being within a threshold distance, it is given a score of 10, and based on the item being in stock, 10 is incremented with another score of 5 to arrive at an aggregated score of 15, and based on the price being the lowest, 15 is aggregated by another 10 to arrive at a final score of 25, which is directly proportional to the overall rank or position on a page (e.g., the top-most rank based on the score being the highest relative to other inventory facilities).

In some embodiments, the store rendering module 112-1 is a stand-alone component, such that it is not part of the query execution module 112 and does not execute queries but rather performs its functionality based on other inputs, such as the interest signal detector 105. For example, in response to determining user interests via the interest signal detector 105, embodiments can automatically render or rank the inventory facilities via the store rending module 112-1 (even without an explicit user query request for an item). In some of these embodiments, the store rendering module 112-1 helps to render or create a personalized page based on what is detected by the interest signal detector 105.

The delivery services module 114 is generally responsible for determining that a set of delivery services (e.g., of a plurality of services) are available to deliver an inventory item from a particular inventory facility to a location of the user. Such delivery services, for example, can be UBER or other third party entities that employ private drivers to transport items from inventory facilities to users. In another example, delivery services can include services directly provided by inventory facilities (e.g., as opposed to third party entities) themselves. Various grocery stores, for example, have resources (e.g., delivery vans and personnel) to help them load grocery items into the delivery vans and delivery the items to users. Using delivery services to coordinate item drop off can help the user reduce shipping costs that would otherwise be apportioned to a user purchasing from an electronic marketplace, for example. In fact, many of these delivery services, such as those provided by retailers themselves, are free of cost.

The delivery services module 114 can determine the set of delivery services in any suitable manner. For example, the delivery services module can connect, via an API, with a retailer server in order to determine a list of all connected delivery services (including its own) available for transporting the items its sells to the user. Alternatively or additionally, the delivery services module 114 can include one or more specialized APIs to one or more third party delivery services (or direct retailer location services) in order to help users schedule a time to deliver the items from the inventory facility to the user or user device's location (e.g., as determined by the geolocation determiner 104).

The user feedback module 116 is configured to receive user input indicative of user feedback and responsively changes or modifies one or more parameters. For example, the user feedback module 116 can add an interest signal, change the way the query execution module 112 ranks or renders inventory facilities, and/or tune or retrain a machine learning model, as described in more detail below. In an illustrative example, the user can "like" or "dislike" the inventory centers that are rendered by the store rending module 112-1, which causes a machine learning module to learn (e.g., via reinforcement learning) these inventory facility preferences so as to affirmatively exclude (by not liking) or include (by liking) particular search results the next time a query for an item is issued or information is presented based on the functionality of the interest signal detector 105.

The presentation module 118 is generally responsible for causing presentation (e.g., display) of data on a user device. In some embodiments, such presentation is in the form of a user interface. Such user interface may be a graphical user interface (GUI), and/or a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on a user device.

In some embodiments, the presentation module 118 causes presentation of content and related information to user devices, such as a personalized page based on the functionality of the registration module 102, the geolocation determiner 104, the interest signal detector 105, the geolocation—store mapper 106, the store—item mapper 108, the query execution module 112, the delivery services module 114, an/or the user feedback module 116. For example, the presentation module 118 may cause a list of ranked inventory facilities, as well as a list of ranked item listing for sale in an electronic marketplace. The presentation module 118 may comprise one or more applications or services on a user device, across multiple user devices, or in the cloud. For example, in one embodiment, presentation module 118 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation module 118 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation module 118 generates structured data, tagged data or otherwise causes presentation of structured or tagged data that was previously unstructured, semi-structured, or untagged.

The consumer application 120 generally refers to one or more computer applications or services, such as online/cloud applications or locally stored apps that consume or utilize the information determined by system 100. In particular, the consumer application 120 may receive query requests for particular item listings and/or generate a list of ranked inventory facilities. In some embodiments, the consumer application 120 may utilize the presentation module 118 to provide information. Examples of consumer applications 118 may include, without limitation, electronic marketplace applications or platforms, inventory management applications, email, messaging, chat, or calling; project management; calendar or scheduling; and task list or to-do applications, and the like.

Storage 125 refers to any suitable data store, such as a relational database, a corpus of data, a data warehouse, main memory, disk, and/or the like. The storage 125 can store any suitable set of data structures, routines, functions, machine learning models, statistical models, and/or any information. For example, storage 125 can store item listings in an electronic marketplace, data structures used by the geolocation—store mapper 106 and store—item mapper 108, interests detected by the interest signal detector 105, registration information stored by the registration module 102, and/or the like.

Figure 2:
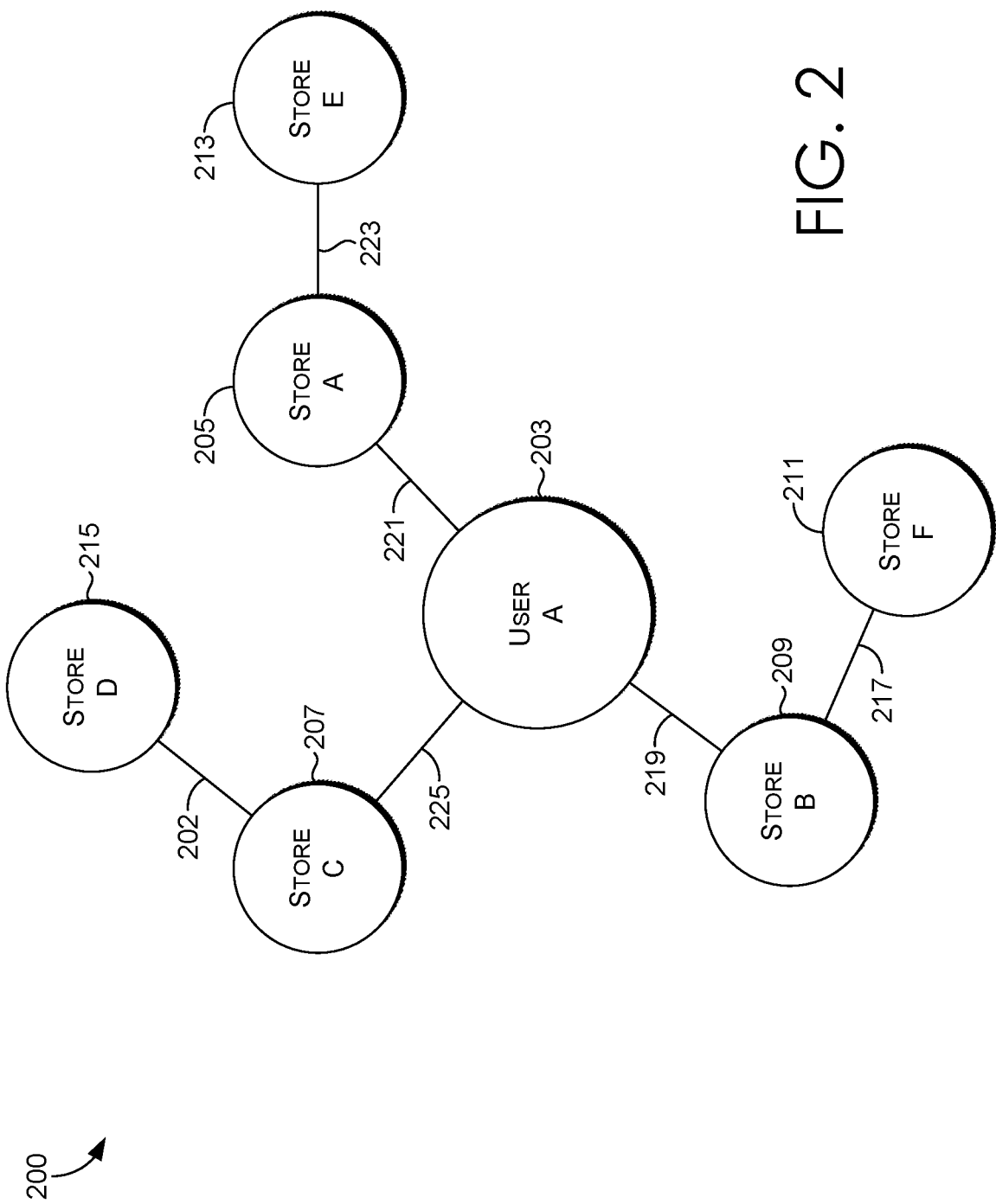
FIG. 2 is a schematic diagram of an example graph structure, according to some embodiments.

FIG. 2 is a schematic diagram of an example graph structure 200, according to some embodiments. In some embodiments, the graph structure 200 is used by the geolocation—store mapper 106 in order to map the user device's or user's location (e.g., a user's address as stored by the registration module 102) to the corresponding inventory facilities. In some embodiments, the graph structure 200 is generated in response to the user registering via the registration module 102 or the determination of the user's location via the geolocation determiner 104.

In some embodiments, the graph structure 200 represents a network graph. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, for example, the graph structure 200 (e.g., an undirected graph) includes the nodes or vertices of—211, 209, 203, 227, 215, 205, and 213. The graph structure 200 further includes various edges linking the nodes, such as the edges 217, 219, 221, 223, 225, and 227.

The graph structure 200 specifically illustrates the real-world distances and/or other relationships (e.g., indicating how much user A likes the different inventory facilities) between user A and various inventory facilities. In some embodiments, the quantity (or thickness) of the edges between particular nodes represents the strength of relationship between nodes. For instance, user A (represented by node 203) may be the same or similar distance to store C (represented by node 207), store A (represented by node 205), and store B (represented by node 209). However, the diameter of edge 221 may be thicker in diameter relative to edges 219 and 225, indicating that store A is frequented more or is liked more by user A. Such functionality can be used to determine the ranking, for example, as described with respect to the store rendering module 112-1. For example, using the illustration above, Store A would be ranked higher than store B and store C based on the thickness of the edges being larger in diameter.

Alternatively or additionally, "node distance" can be used to rank inventory facilities by the store rendering module 112-1 and/or determine which inventory centers are within a threshold distance, as described with respect to the geolocation—store mapper 106. In some embodiments, a "distance" in terms of network graphs corresponds to a number of edges (or edge sets) in a shortest path between vertex U and vertex V. In some embodiments, if there are multiple paths connecting two vertices, then the shortest path is considered as the distance between two vertices. Accordingly, distance can be defined as d(U,V). For instance, the distance between node 203 and node 2125 is 2 (i.e., there are two edges 225 and 227 between nodes 203 and node 215), whereas the distance between node 203 and node 205 is 1 (i.e., there is only 1 edge 221 between nodes 203 and 205). This may indicate, for example, that store A is closer in the real-world to the user A relative to the distance between the store D and user A. In these instances, particular embodiments can set particular predetermined distance thresholds and select inventory facilities based on the distance. For example, the predetermined distance may be 2, and a rule may be to select any inventory facility that is within a distance of 2 relative to the node 203 representative of user A. In this example, all of the nodes 215, 207, 205, 213, 209, and 211 representative of all of the stores would be selected. However, if any node, for example, was connected to node 211 (and not node 203), this extra node would be excluded from selection based on the distance surpassing the threshold of 2 (because it would be a distance of 3).

In some embodiments, the geolocation—store mapper 106 and/or the store rendering module 112-1 alternatively or additionally uses other mechanisms for mapping the user's location to the particular inventory facilities via the graph structure 200. For example, embodiments can select a predetermined quantity of the node 203's (user A) closest connections. For example, if the predetermined quantity is 3, embodiments would select nodes 209, 205, and 207, corresponding to store B, store A, and store C respectively, because they represent the three closest inventory facilities relative to the location of user A.

Figure 3:
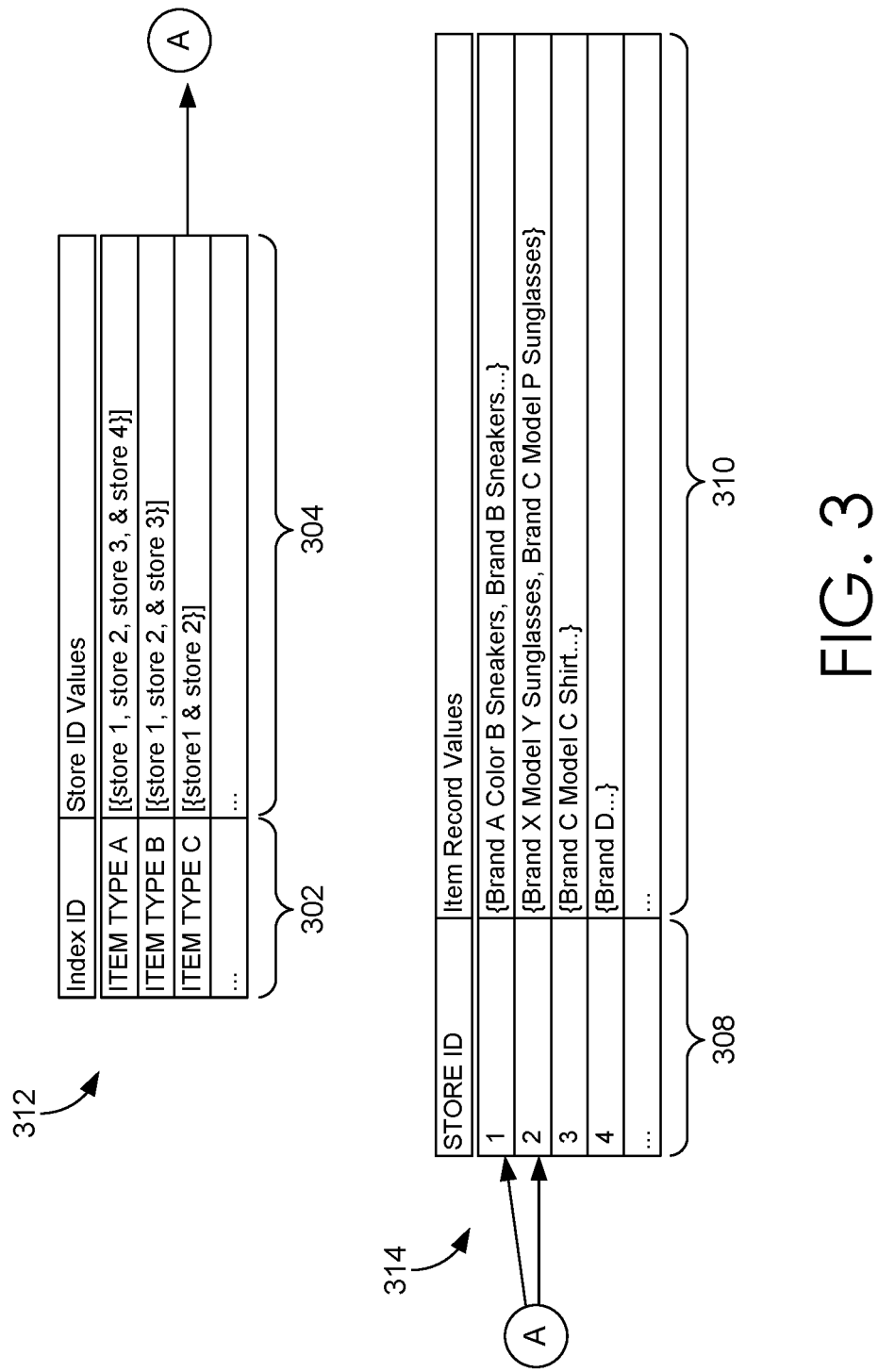
FIG. 3 is schematic diagram of an example index table and an inventory value table used to determine whether particular inventory facilities have particular items, according to some embodiments.

FIG. 3 is schematic diagram of an example index table 312 and an inventory value table 314 used to determine whether particular inventory facilities have particular items, according to some embodiments. In some embodiments, the index table 312 and/or the inventory value table 314 represents the data structures used by the store—item mapper 108 in order to map particular inventory facilities to the particular items they offer for sale, have in stock, or otherwise carry. Alternatively or additionally, the index table 312 and/or the inventory value table 313 can be used by the store rendering module 112-1 to render particular stores of interest.

The index table 312 is illustrated as a key-value pair where the key or index ID 302 indicates indicate the inventory (or item) type IDs (and not the specific identity of the inventory items themselves). For example, the inventory type IDs may be categories, such as "shoes", "groceries", "jackets", "phones", "outdoors", and the like. The values 304 indicate a given inventory facility ID (i.e., store ID). In this way, embodiments can map particular types of items to the particular inventory facilities that carry or sell the corresponding item types in order to determine the types of goods they have in stock or sell. Accordingly, for example, particular inventory facilities that do not carry, have in stock, or sell particular types of item can be excluded by the store—item mapper 108 and/or the store rendering module 112-1, for example.

The inventory value table 314 is also illustrated as a key-value pair where the key indicates the store ID 308 and the values 310 correspond to the particular items for sale or are in stock at the corresponding retailer facility. For example, the inventory value table 314 indicates that for store 1 (e.g., a particular sports outlet), there are specific sneaker items, such as brand A, color B sneakers, and brand B sneakers. And for store 2, there are very specific brands and models of sunglasses. In some embodiments, the index table 312 and/or the inventory value table 314 is presented or displayed to a computing device such that an administrator can view the information, such as the relationships, as well as modify information, such as the amount of metadata or contextual data mapped to a given resource. Alternatively, in some embodiments, the index table 312 and/or the inventory value table 314 are data structures to be accessed in the background and are not presented to administrators but are rather to be generated by programmers to execute requests. In some embodiments, the values 310 also include metadata associated with particular inventory values, such as timestamps of the last stock of the item, whether the item is in stock, the price of the item for sale, and/or the like, which can be used to rank particular inventory facilities, for example, as described with respect to the store rendering module 112-1.

FIG. 3 also illustrates the relationship between the index table 312 and the inventory values table 314 at runtime. For example, a user may issue a query for a first item. Responsively, some embodiments receive this request and map (e.g., via natural language processing (NLP)) the query to an inventory type. Responsively, embodiments can scan the index table 312 in order to map the inventory type of the query to an inventory type in the index ID field 302 that matches the inventory type of the query. Responsively, embodiments read the corresponding store ID value. For example, if the query was of inventory type C, then embodiments can scan the adjacent field to determine that the particular stores that carry inventory type C, are stores 1 and 2. Responsively, some embodiments identify the store IDs 1 and 2 (and not store IDs 3 and 4 since only these inventory facilities all carry the inventory type C item) under the inventory type ID column 308 and lookup each corresponding value under the inventory item record values 310, as illustrated by the reference indicators 320 representing pointer values or other references. In this way, the index table 312 is a helper data structure that references entries within the resource table 314. Both of these data structures 312 and 314 can therefore be used together to determine which inventory facility carries what items.

Figure 4:
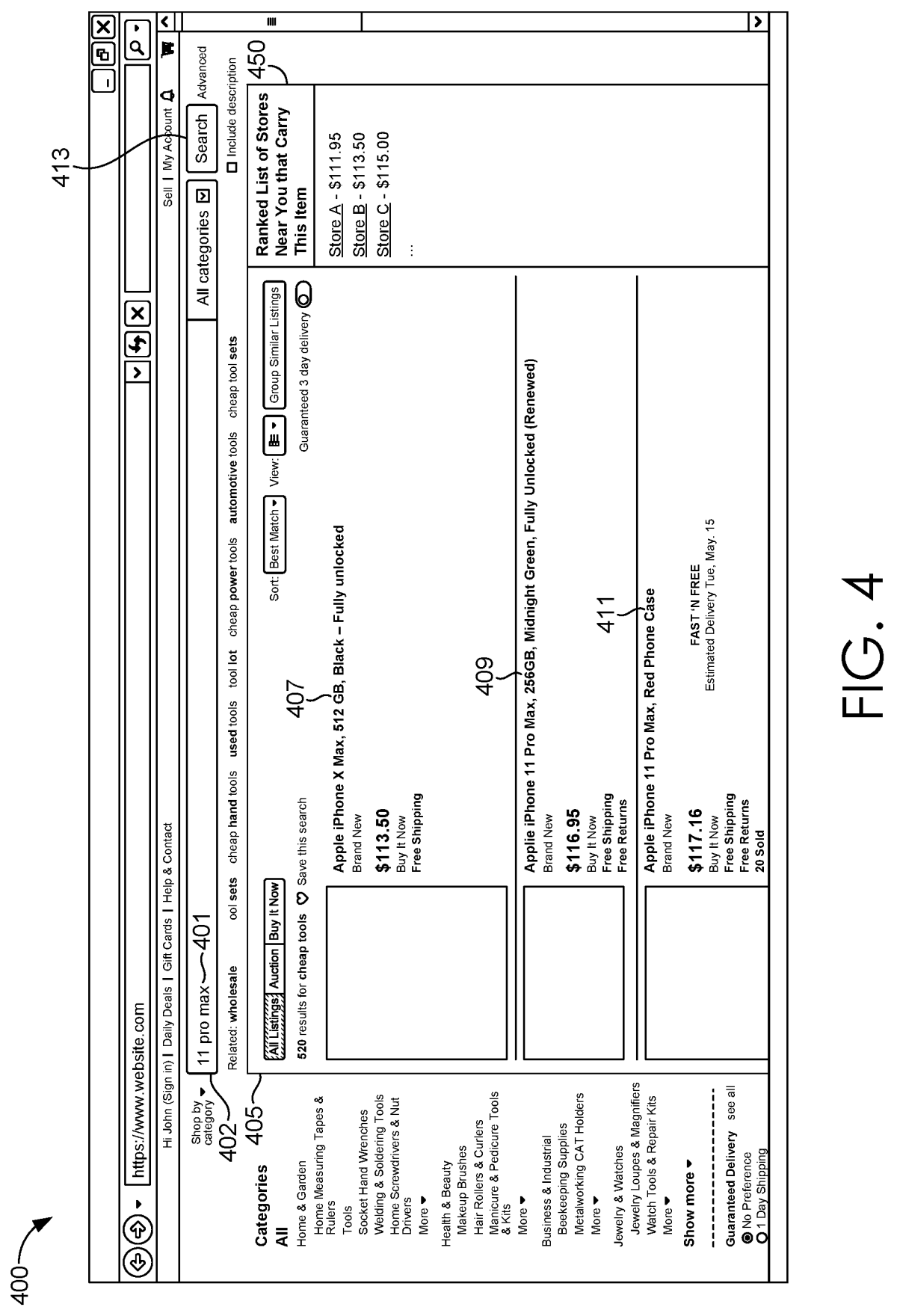

FIG. 4 is a screenshot 400 of an example user interface, according to some embodiments. In some embodiments, the screenshot 400 represents what is caused to be presented by the presentation module 118 of FIG. 1. Likewise, in some embodiments, the screenshot 200 corresponds to a page that is a part of the consumer application 120. In some embodiments, the screenshot 400 represents an electronic marketplace application.

At a first time, the search field 402 receives the query 401, which is issued by a user. In some embodiments, in response to receiving an indication (e.g., a flag) that the user has selected the search button 413 to perform a search on the query 401, one or more of the components of FIG. 1 performs its functionality. For example, in response to receiving an indication that the user has selected the search button 413, embodiments can determine the location of the user or user device via the geolocation determiner 104, detect that the user is interested in the item indicated in the query 401 via the interest signal detector 105, map the user's location to the inventory facilities within a threshold distance of the user via the geolocation-store mapper 106, and/or determine which inventory facilities carry, offer for sale, or have in stock the item indicated in the query 401 via the store—item mapper 108, all of which may occur in order to execute the query 401 via the query execution module 112.

One of the outputs of executing the query 401 is the search results page 405, which illustrates a ranked list of item listings 407, 409, and 411 that are for sale via an electronic marketplace (e.g., and not an inventory facility). Another output of executing the query 401 is the UI element 450, which illustrates a ranked list of physical retailer locations near the user (or user device) that carry the item indicated in the query 401. In some embodiments, the ranking of these physical retailer locations near the user occurs as described with respect to the store rendering module 112-1. For example, stores A, B, and C can be ranked and presented at the UI element 450 based on distance to the user, price of the item, how much the user likes the stores, and the like. In some embodiments, determining which physical retailer locations are near the user occur based on functionality as described with respect to the geolocation determiner 104, the geolocation—store mapper 106, the store—item mapper 108, and the store rendering module 112-1 of FIG. 1. In some embodiments, the UI element 450 includes API functionality to connect with the corresponding physical retailer locations in order to make an actual purchase of the item from the inventory facilities (as opposed to the electronic marketplace). The screenshot 400 thus illustrates that both item listings of an electronic marketplace and physical retailer locations can be ranked and rendered to the user based on the user issuing a single query 401. The user can then, for example, compare the prices of the item listings for sale at the electronic marketplace with those for sale at the physical retailer locations.

Figure 5:
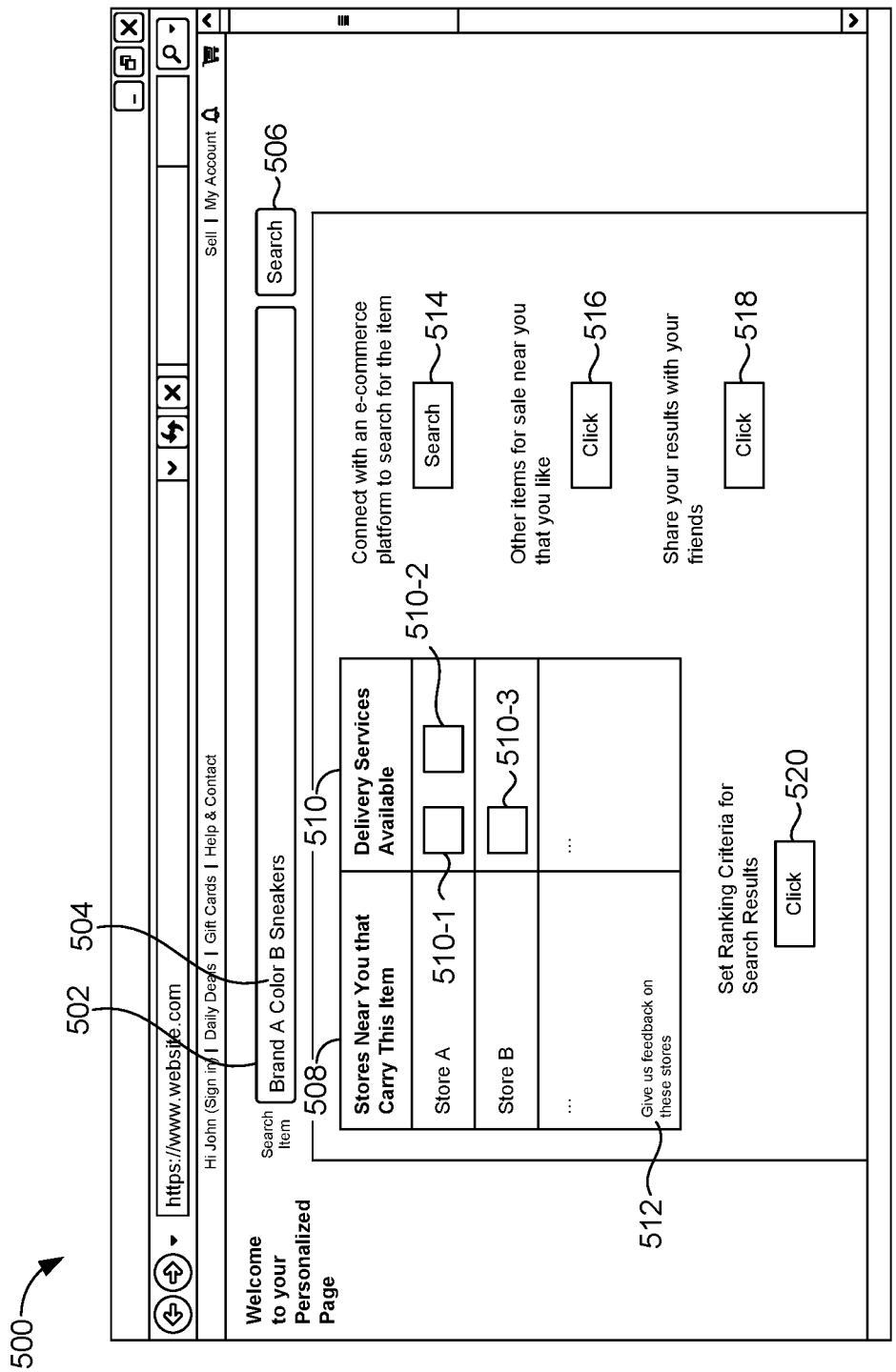
FIG. 5 is a screenshot of an example user interface, according to some embodiments.

FIG. 5 is a screenshot 500 of an example user interface, according to some embodiments. In some embodiments, the screenshot 500 represents what is caused to be presented by the presentation module 118 of FIG. 1. Likewise, in some embodiments, the screenshot 500 corresponds to a page that is a part of the consumer application 120. In some embodiments, the screenshot 500 represents a personalized page. A "personalized page" as described herein refers to a page that contains information specific to a particular user, such as inventory facilities near the user, inventory facilities that the user likes, formatting of the page based on user wants, and the like. Accordingly, personalized pages may have a different look and feel for different users. In some embodiments, the personalized page is made based on the user interests detected by the interest signal detector 105. In some embodiments, some or each of content indicated in the screenshot 500 is based on one or more of the components of the system 100 of FIG. 1.

In some embodiments, the search field 502 receives the query 504. In some embodiments, in response to receiving an indication that the user has selected the search button 506, the UI elements 508 and 510 are caused to be displayed. The UI element 508 indicates the physical retailer locations that are near a user (or user device) and the UI element 510 indicates the corresponding delivery services available to deliver the item indicated in the query 504 from the corresponding physical retailer location to the user. In some embodiments, in response to receiving an indication that the user has selected the search button 506, the geolocation determiner 104, the interest signal detector 105, the geolocation—store mapper 106, the store—item mapper 108, and/or the store rendering module 112-1 performs its functionality in order to provide the output of the UI element 508. In some embodiments, in response to receiving an indication that the user has selected the search button 506, the delivery services module 114 performs its functionality in order to provide the UI element 510. In some embodiments, the UI elements 508 and 510 are rendered not in response to receiving an indication that the user has selected the search button 506 but can be provided, for example, for all items that the user likes according to the interest signal detector 105.

UI elements 510-1, 510-2, and 510-3 correspond to different delivery services, such as the corresponding store delivery services and/or third party delivery services. In some embodiments, the UI elements 510-1, 510-2, and 510-3 are selectable buttons or other UI elements that are configured to connect (e.g., via specialized APIs), to retailer or third party servers in order to schedule a delivery of the corresponding item. For example, in response to receiving an indication that a user has selected the button 510-1, embodiments can connect, via an API, to a third party delivery service, so that a user can schedule a delivery of the item indicated in the query 504 from the store A to the user's location.

In response to receiving an indication that the user has selected the UI element 512, various embodiments cause a pop-up window or other field to be displayed to a user so that the user can give feedback. Such feedback can be, for example, "I don't like this store", "I never want to use a third party delivery service", "this is my favorite store", and the like. In some embodiments, this can be recorded as an interest signal and/or be provided as feedback, via NLP and via the user feedback module 116, so that embodiments (e.g., a reinforcement machine learning model) can learn or incorporate the feedback for future sessions or queries. For example, in response to receiving an indication that a user has issued a similar query to the query 504, embodiments, may not surface the store B if the user has previously indicated that the user does not like store B.

In response to receiving an indication that the user has selected the UI element 520, particular embodiments cause display of a pop-up window or other UI element so that the user can specify how physical retailer locations are ranked. For example, the user can specify to rank stores based on the distance to the user (closer ones being ranked higher), and/or the price (cheaper items ranked higher) of the item.

In response to receiving an indication that the user has selected the search button 514, particular embodiments automatically connect with an e-commerce or electronic marketplace platform to search for the item indicated in the query 504. In some embodiments, in response to receiving an indication that the user has selected the button 514, embodiments automatically connect, via an API, to an electronic marketplace such that the user is prompted to login (e.g., via manually entering the username and password) at the electronic marketplace. Subsequently, the user can then manually re-enter the query 504 at a search engine field of the electronic marketplace. Alternatively, in some embodiments, in response to receiving an indication that the user has selected the button 514, embodiments automatically perform a search on a separate electronic marketplace search engine by, for example, automatically connecting, via an API, to the electronic marketplace and automatically search for item listing search results based on the query 504 without the user having to manually login or manually re-entering the query. In these embodiments, the screenshot 500 may be a separate or different application relative to the electronic marketplace because they are, for example, hosted at two different machines or servers and entities (e.g., companies).

In response to receiving an indication that the user has selected the button 516, particular embodiments can cause display of other item that the user likes that are for sale. Such functionality can be provided by the interest signal detector 105, as described with respect to FIG. 1. In response to receiving an indication that the user has selected the button 518, various embodiments share search results or other information with other devices corresponding to the user's friends. For example, embodiments can connect, via an API, with a social media server in order to share UI elements 508 and 510 with the user's friends as indicated by the social media platform. In another example, particular embodiments can send an SMS text or email of the UI elements 508 and 510 to other devices corresponding to the user's friends.

Figure 6:
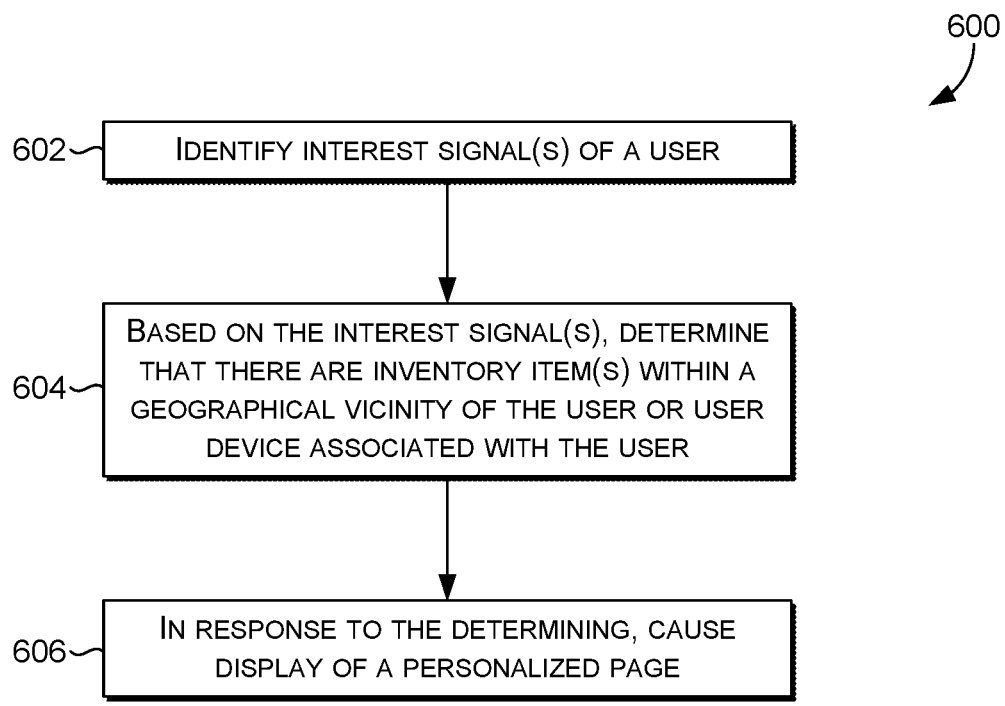
FIG. 6 is a flow diagram of an example process for causing display of a personalized page, according to some embodiments.

FIG. 6 is a flow diagram of an example process 600 for causing display of a personalized page, according to some embodiments. The process 600 (and/or any of the functionality described herein (e.g., process 700)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 600, 700, and/or any other functionality described herein.

Per block 602, one or more interest signals of a user are identified. Examples of this step are described with respect to the interest signal detector 105 of FIG. 1. In some embodiments, the identifying of the one or more interest signals occurs in response to receiving a query request for an item for sale in an electronic marketplace. Examples of this are described with respect to FIG. 4, where embodiments can receive the query 401 and responsively identify that the user is interest in the corresponding item (the particular phone) indicated in the query 401.

Per block 604, based on the one or more interest signals, some embodiments determine that there are one or more inventory items within a geographical vicinity of the user or use device associated with the user. Examples of this block are described with respect to the geolocation—store mapper 106 of FIG. 1. In some embodiments, the plurality of inventory items are within one or more physical retailer locations located within the geographical vicinity and the determination at block 604, for example, occurs by determining that the one or more physical retailer locations are within a threshold distance and/or communication range of the user device.

In some embodiments, the determining that there are a plurality of inventory items within the geographical vicinity of the user device at block 604 includes detecting, in near real-time, geo-coordinates of the user device. Examples of this are described with respect to the geolocation determiner 104 and the geolocation store mapper 106 of FIG. 6. For example, some embodiments, can detect, via a GPS module located on a user device, the latitude and longitude coordinates of the user device. Based on the near real-time feed of the coordinates, embodiments can determine which physical retailer locations are within a threshold distance (e.g., 5 miles) of the GPS coordinates (e.g., via lookup of a data structure or map that indicates the locations or via radio communication with devices (e.g., beacons or tags) located at the locations).

Alternatively or additionally, in some embodiments, the determining that there are a plurality of inventory items within the geographical vicinity of the user at block 604 includes receiving user input indicating an address of the user and receiving user input of physical retailer locations that sell the plurality of inventory items. Examples of this are described with respect to the registration module 102 of FIG. 1. Accordingly, at registration time the user can manually input the user's home or business address and then manually input each physical retailer location that the user likes.

Alternatively or additionally, in some embodiments, the determining that there are a plurality of inventory items within the geographical vicinity of the user at block 604 includes receiving a geocoded indicator (e.g., an IP address) transmitted by the user device based on establishing a communication session (e.g. channels are opened for communication) with the user device and responsively determining which inventory facilities offer an inventory item for sale that is within a threshold distance from the geocoded indicator. For example, referring back to FIG. 4 in response to a user issuing an HTTP request via a browser application to arrive at the screenshot 400, an electronic marketplace server can automatically establish a communication session with a user device, which includes receiving the IP address of the user device to determine the user device's location. Responsively (e.g., before the query 401 is executed), embodiments can determine that the stores indicated in the UI element 450 are within a threshold distance from the IP address.

Per block 606, in response to the determining at block 604, particular embodiments cause display of a personalized page. Examples of the personalized page are described with respect to the screenshot 500 of FIG. 5. The page can be personalized with the one or more inventory items based at least in part on the geographical vicinity as described, for example, with respect to the UI element 508 of FIG. 8.

In some embodiments, block 606 is succeeded by other functionality. For example, some embodiments determining that a set of delivery service, of a plurality of delivery services, are available to delivery an inventory item, of a plurality of inventory items, from one or more physical retailer location to a location of the user. And based on this determination, embodiments cause display, to the page, the set of delivery services. Examples of this are described with respect to the delivery services module 114 of FIG. 1 and the UI element 510 of FIG. 5. In another example, some embodiments generate a notification, where the notification indicates, to the page, items for sale that the user likes (e.g., as determined by the interest signal detector 105). Examples of this are described with respect to the UI element 516 of FIG. 5.

In yet another example, some embodiments determine, based on the interest signals, that an inventory item is offered for sale at a plurality of physical retailer locations within the geographical vicinity. Embodiments can then rank the plurality of physical retailer locations. Then embodiments can then cause display, to the page, the ranked plurality of physical retailer locations. Examples of this are described with respect to the store rendering module 112-1 of FIG. 1 and the UI element 450 of FIG. 4, where there is a ranked list of stores near the user that carry the item indicated in the query 401. Some embodiments additionally rank a plurality of item listings that indicate the inventory item and the cause display, to the page, the ranked item listings. Examples of this are described with respect to the search result page 405 of FIG. 4, which ranks the item listings 407, 409, and 411.

Figure 7:
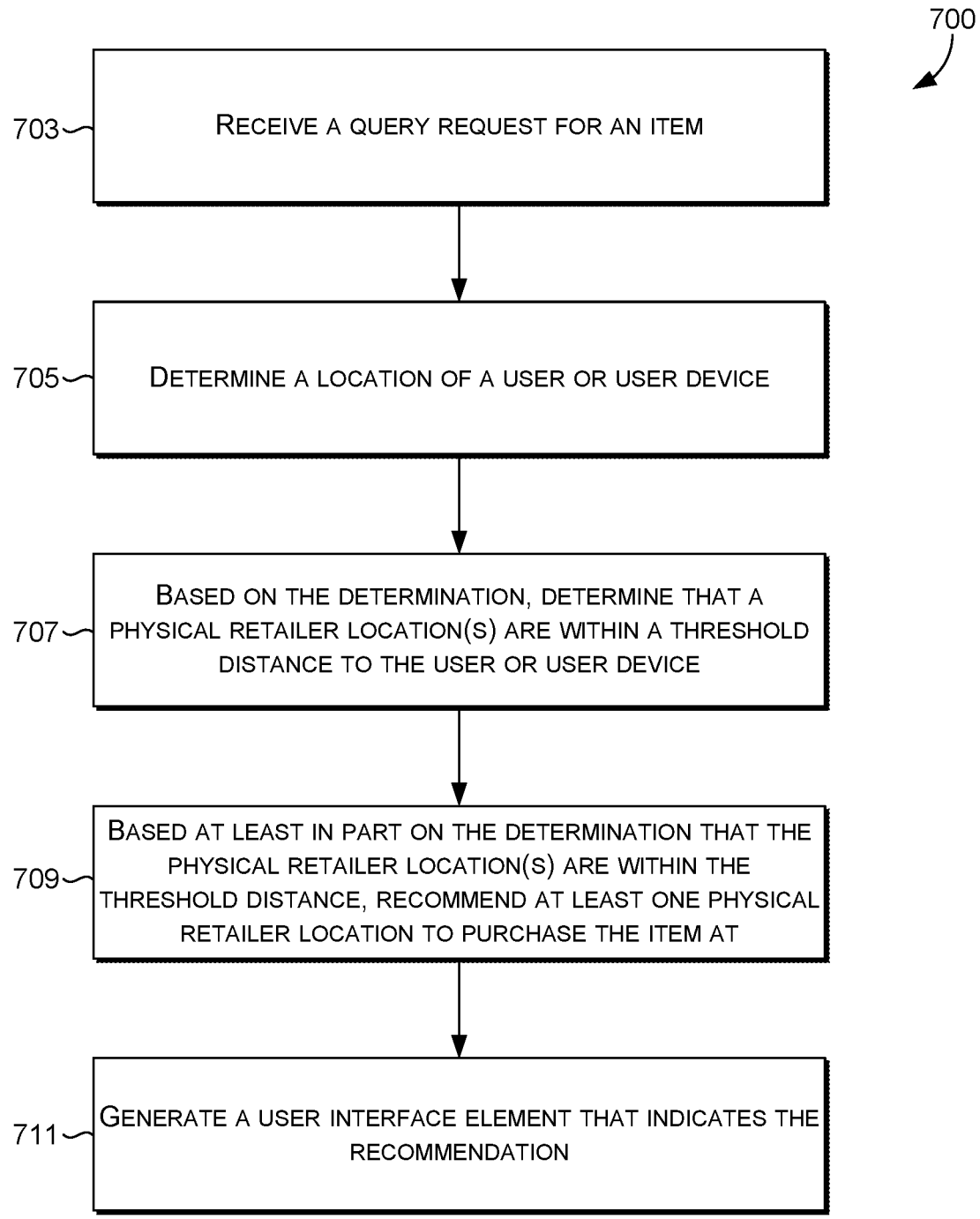
FIG. 7 is a flow diagram of an example process for generating a user interface element that indicates a recommendation of at least one physical retailer location to purchase an item at, according to some embodiments.

FIG. 7 is a flow diagram of an example process 700 for generating a user interface element that indicates a recommendation of at least one physical retailer location to purchase an item at, according to some embodiments. Per block 703, particular embodiments receive a query request for an item. The request may originate from a user device associated with (e.g., belonging to) a user. In some embodiments, the query request is form an item for sale in an electronic marketplace. Examples of this (and block 703 in general) are described with respect to FIG. 4. For example, embodiments can receive the query 401 in response to receiving an indication that the user has selected the search button 413.

Per block 705, particular embodiments determine a location of a user or user device (e.g., the same user or user device where the received query request at block 703 originated from). In some embodiments, for example, the determining of the location of the user device includes detecting, in near real-time, geo-coordinates of the user device. Examples of this are described with respect to the geolocation determiner 104. For example, embodiments can receive, via a GPS module located at a user device, the user device's latitude and longitude coordinates. In some embodiments, for example, particular embodiments determine the location of the user by receiving user input indicating an address (e.g., residential or business) of the user. Examples of this are described with respect to the geolocation determiner 104 and the registration module 102. For example, some embodiments receive user input indicating the user's home address. Some embodiments additionally or alternatively determine the location of the user device by receiving a geocoded indicator (e.g., an IP address) transmitted by the user device based on establishing a communication session with the user device. Examples of this are described with respect to the geolocation determiner 104. For example, some embodiments automatically receive an IP address as a part of or in response to an electronic marketplace server opening up a communication channel with a user device, where the user device transmits its IP address to the electronic marketplace server.

Per block 707, some embodiments determine that one or more physical retailer locations are within a threshold distance to the user device or user based on the determination at block 705. Examples of this are described with respect to the geolocation—store mapper 106 of FIG. 1. For example, some embodiments can determine that various stores are within 5 miles of the user based on using the graph structure 200 of FIG. 2.

Per block 709, based at least in part on the determination that the one or more physical retailer locations are within the threshold distance at block 707, some embodiments recommend at least one physical retailer location to purchase the item at. Examples of this are described with respect to the store rendering module 112-1 of FIG. 1, the UI element 450 of FIG. 4, and the UI element 508 of FIG. 5. In some embodiments, block 709 is preceded by functionality that determines a subset of physical retailer locations, of the one or more physical retailer locations, that offer the item for sale (e.g., and/or currently have the item in stock). Examples of this are described with respect to FIG. 3 and the store—item mapper 108. For example, referring back to FIG. 3, for inventory item C, only stores 1 and 2 may offer the item for sale. Accordingly, stores 1 and 2 are a subset of the rest of the stores, such as stores 3 and 4 (which may not offer the items for sale). In this way, for example, items that are not within the subset can be excluded for consideration to be candidates to purchase an item at, for block 709. Accordingly, in some embodiments the recommending at block 709 can be one of the subset of physical retailer locations based at least in part on the determination of the subset.

In some embodiments, the recommending at block 709 includes or represents the ranking or rendering of physical retailer locations. For example, some embodiments can rank the at least one of the physical retailer locations (or subset), such that the recommendation is based on the ranking. Examples of such recommendation, for example, is described with respect to the UI element 450, which indicates the ranked list of stores near the user that carries the item. One or more of these ranked stores can be considered recommendations per block 709. Another example of a recommendation includes those stores listed at the UI element 508 of FIG. 5 (which may not be ranked). Other examples of block 709 are described with respect to the store rendering module 112-1 of FIG. 1.

Per block 711, some embodiments generate a user interface element that indicates the recommendation. Examples of this are described with respect to the user interface element 450 of FIG. 4 and user interface element 508 of FIG. 5.

In some embodiments, block 711 is succeeded by other functionality. For example, some embodiments determine that a set of delivery services, of a plurality of delivery services, are available to deliver the item from the physical retailer location to a location of the user and based on this determination, embodiments cause display of the set of delivery services. Examples of this are described with respect to the delivery services module 114 of FIG. 1 and the UI element 510 of FIG. 5. In another example, some embodiments additionally or alternatively generate a notification, where the notification indicates other items for sale that the user likes. Examples of this are described with respect to the UI element 516 of FIG. 5.

Figure 8:
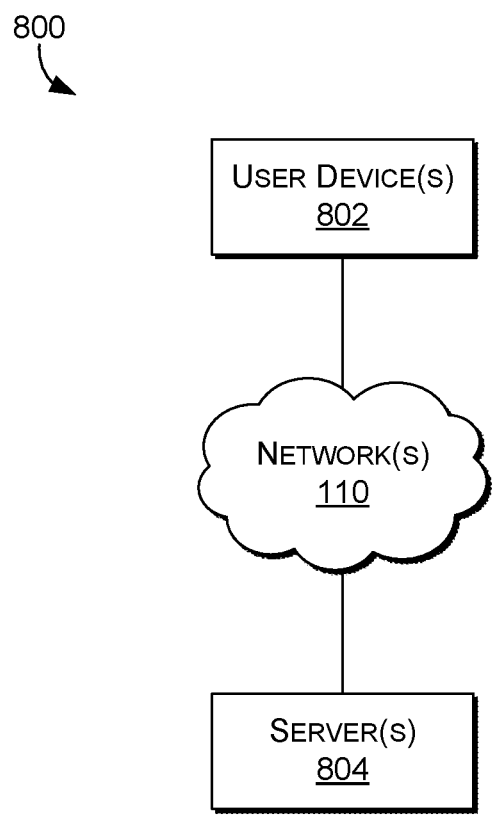
FIG. 8 is a block diagram of a computing environment in which aspects of the present disclosure are employed in, according to some embodiments.

FIG. 8 is a block diagram of a computing environment 800 in which aspects of the present disclosure are employed in, according to certain embodiments. Although the environment 800 illustrates specific components at a specific quantity, it is recognized that more or less components may be included in the computing environment 800. For example, in some embodiments, there are multiple user devices 802 and multiple servers 804 (e.g., electronic marketplace servers), such as nodes in a cloud or distributing computing environment. In some embodiments, some or each of the components of the system 100 of FIG. 1 are hosted in the one or more servers 804. Alternatively, in some embodiments, some or each of the components of the system 100 are hosted in the user device 802. In some embodiments, the user device(s) 802 and/or the server(s) 804 may be embodied in any physical hardware, such as the computing device 900 of FIG. 9.

The one or more user devices 802 are communicatively coupled to the server(s) 804 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 804 and the user devices 802.

In some embodiments, a user issues a query on the one or more user devices 802, after which the user device(s) 802 communicate, via the network(s) 110, to the one or more servers 804 and the one or more servers 804 executes the query (e.g., via one or more components of FIG. 1) and causes or provides for display information back to the user device(s) 802. For example, the user may issue the query 401 of FIG. 4 at the user device 802 to request item listings that sell corresponding items indicated in the query 401. Responsively, the one or more servers 804 execute the query, such as generating the search results page 405 and the ranked list of stores near the user that carries the item per the UI element 450.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 9:
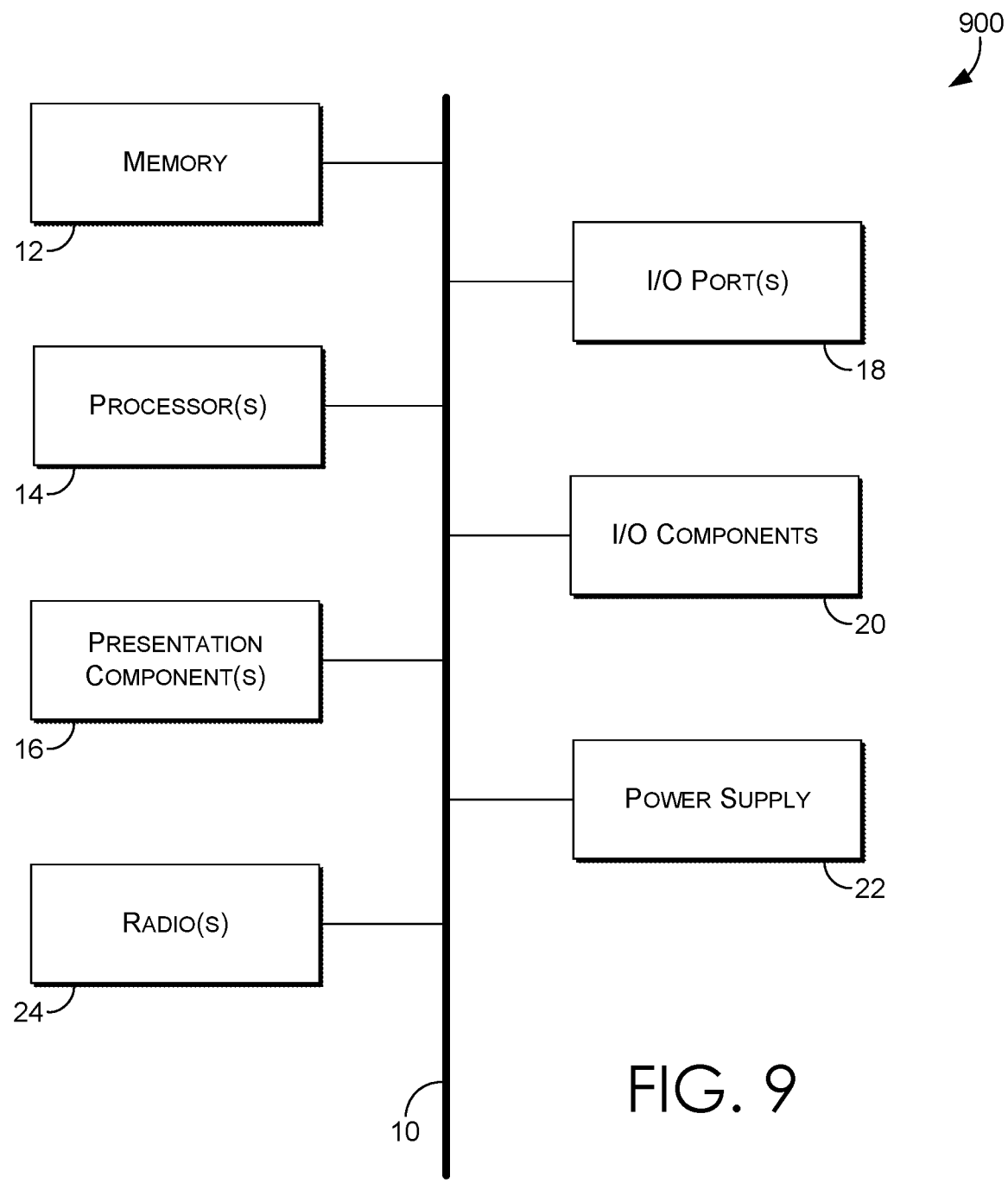
FIG. 9 is a block diagram of a computing device in which aspects of the present disclosure are implemented within, according to some embodiments.

With reference to FIG. 9, computing device 900 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof).

Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

In some embodiments, the computing device 900 represents the physical embodiments of one or more systems and/or components described above. For example, the computing device 900 can represent: the one or more user devices 902, the server(s) 904 of FIG. 8. The computing device 900 can also perform some or each of the blocks in the process 600, 700 and/or any functionality described herein with respect to FIGS. 1-9. It is understood that the computing device 900 is not to be construed necessarily as a generic computer that performs generic functions. Rather, the computing device 900 in some embodiments is a particular machine or special-purpose computer. For example, in some embodiments, the computing device 900 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 14 that read data from various entities such as memory 12 or I/O components 20. Presentation component(s) 16 present data indications to a user or other device. Exemplary presentation components 16 include a display device, speaker, printing component, vibrating component, etc.

I/O ports 18 allow computing device 900 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A system comprising:
   at least one processor; and
   at least one computer readable data storage device storing instructions that, when executed by the at least one processor, cause the system to:
   establish, via network handshaking, a communication session between an electronic marketplace server and user device, the electronic marketplace server hosting an electronic marketplace;
   in response to the establishing of the communication session, automatically cause a network channel to be opened between the electronic marketplace server and the user device;
   in response to the network channel being opened, automatically receive, in near real-time and from the user device via a network protocol packet, a geocoded indicator that indicates a location of the user device;
   while the network channel is opened, receive a query request for an item for sale in the electronic marketplace, the request originating from the user device associated with a user;
   in response to the receiving of the query request, access, in the computer readable data storage device, a first data structure, the first data structure includes location data of a plurality of physical retailer locations;
   based on the accessing of the first data structure and the automatic receiving, in near real-time and from the user device via the network protocol packet, the geocoded indicator, detect, at a first time and via at least one of a beacon or a tag, that a device within at least one of the plurality of physical retailer locations is within a signal strength threshold to the user device;
   in response to the detecting that the device within at least one of the plurality of physical retailer locations is within the signal strength threshold partially execute the query by ranking the at least one of the plurality of physical retailer locations;
   detect, at a second time subsequent to the first time and via the at least one of the beacon or the tag, that the device within the at least one of the plurality of physical retailer locations is outside of the signal strength threshold to the user device;
   based at least in part on the detecting, at the second time subsequent to the first time, that the device within the at least one of the plurality of physical retailer locations is outside of the signal strength threshold to the user device, modify the ranking of the at least one of the plurality of physical retailer locations;
   partially execute the query by ranking a plurality of item listings that describe the item, the plurality of item listings being associated with the electronic marketplace; and
   based at least in part on the modifying of the ranking of the at least one of the plurality of physical retailer locations and the ranking of the of the plurality of item listings, cause generation, at a page of the electronic marketplace, of first user interface elements and second user interface elements, the first user interface elements indicate the modified ranking of the at least one of the plurality of physical retailer locations, the second user interface elements indicate the ranking of the item listings.

2. The system of claim 1, wherein the system is further caused to:
   in response to the receiving of the query request for the item for sale in the electronic marketplace and based on the modified ranking of the plurality of physical retailer locations, determine that a set of delivery services, of a plurality of delivery services, are available to deliver the item from the one or more of the plurality of physical retailer locations to a location of the user; and based on the determining, causing display, at the page, of the set of delivery services.

3. The system of claim 1, wherein a determining of the location of the user device includes detecting, in near real-time, geo-coordinates of the user device.

4. The system of claim 1, wherein a determining of the location of the user includes receiving user input indicating an address of the user.

5. The system of claim 1, further comprising generating a notification, wherein the notification indicates other items for sale that the user likes.

6. One or more computer storage media having computer-executable instructions embodied thereon that, when executed, by one or more processors, cause the one or more processors to:

establish, via network handshaking, a communication session between an electronic marketplace server and user device, the electronic marketplace server hosting an electronic marketplace;

in response to the establishing of the communication session, automatically cause a network channel to be opened between the electronic marketplace server and the user device;

in response to the network channel being opened, automatically receive, in near real-time and from the user device via a network protocol packet, a geocoded indicator that indicates a location of the user device;

while the network channel is opened, receive a query request for an item for sale in the electronic marketplace, the request originating from the user device associated with a user;

based at least in part on the automatic receiving, in near real-time and from the user device via the network protocol packet, the geocoded indicator, detect, at a first time and via at least one of a beacon or a tag, that a device within at least one of the plurality of retailer locations is outside of a signal strength threshold to the user device;

based at least in part on the detecting, at the first time and via at least one of the beacon or the tag, that the device within at least one of the plurality of retailer location is outside of the signal strength threshold to the user device, partially execute the query request by ranking each physical retailer location, of the plurality of physical retailer locations;

detect, at a second time and via at least one of the beacon or the tag, that the device within at least one of the plurality of retailer locations is within the signal strength threshold to the user device;

based at least in part on the detecting, at the second time and via at least one of the beacon or the tag, that the device within at least one of the plurality of retailer locations is within the signal strength threshold to the user device, modify the ranking of the at least one of the plurality of physical retailer locations;

at least partially execute the query request by ranking a plurality of item listings that describe the item, the plurality of item listings being associated with the electronic marketplace, each item listing, of the plurality of item listings, including a title and a price of the item; and based at least in part on the modified ranking of the at least one physical retailer location and the ranking of the plurality of item listings, cause generation, at a page of the electronic marketplace, of first user interface elements and second user interface elements, the first user interface elements that indicate the ranking of each physical retailer location, the second user interface elements indicate the ranking of the item listings and include the title and the price of each item listing, of the plurality of item listings.

7. A computer-implemented method comprising:

establishing, via network handshaking, a communication session between an electronic marketplace server and user device, the electronic marketplace server hosting an electronic marketplace;

in response to the establishing of the communication session, automatically causing a network channel to be opened between the electronic marketplace server and the user device;

in response to the network channel being opened, automatically receiving, in near real-time and from the user device via a network protocol packet, a geocoded indicator that indicates a location of the user or user device;

while the network channel is opened, receiving a query request for an item for sale in the electronic marketplace;

based at least in part on the automatic receiving, in near real-time and from the user device via the network protocol packet, the geocoded indicator, detecting, at a first time and via at least one of a beacon or a tag, that a device within at least one of a plurality of retailer locations is inside of a signal strength threshold to the user device;

based at least in part on the detecting, at the first time and via at least one of the beacon or a tag, that the device within at least one of the plurality of retailer locations is inside of a signal strength threshold to the user device, partially executing the query request by ranking the at least one of the plurality of physical retailer locations;

detecting, at a second time subsequent to the first time and via at least one of the beacon or the tag, that the device within at least one of the plurality of retailer locations is outside of the signal strength threshold to the user device;

based at least in part on the detecting, at the second time subsequent to the first time and via at least one of the beacon or the tag, that the device within at least one of the plurality of retailer locations is outside of the signal strength threshold to the user device, modifying the ranking of the at least one of the plurality of retailer locations;

at least partially executing the query request by ranking a plurality of item listings that describe the item, the plurality of item listings being associated with the electronic marketplace, each item listing, of the plurality of item listings, including a title and a price of the item; and based at least in part on the modified ranking of the at least one of the plurality of physical retailer locations and the ranking of the plurality of item listings, causing generation, at a page of the electronic marketplace, of first user interface elements and second user interface elements, the first user interface elements indicate the ranking of each physical retailer location, the second user interface elements indicate the ranking of the item listings and include the title and the price of each item listing, of the plurality of item listings.

8. The method of claim 7, further comprising identifying one or more interest signals in response to receiving a query request for the item for sale in the electronic marketplace.

9. The method of claim 7, further comprising:
   determining that a set of delivery services, of a plurality of delivery services, are available to deliver a the item from a first physical retailer locations, of the subset of physical retailer locations, to a location of the user; and
   based on the determining, causing display, to the page, an indication of the set of delivery services.

10. The method of claim 7, further comprising, determining that the plurality of physical retailer locations are within a threshold distance to the user device based at least in part on detecting, in near real-time, geo-coordinates of the user device.

11. The method of claim 7, further comprising determining that the plurality of physical retailer locations are within a threshold distance to the user device or user based at least in part on receiving user input indicating an address of the user and receiving user input of a plurality of physical retailer locations that sell the plurality of inventory items.

12. The method of claim 7, further comprising generating a notification, wherein the notification indicates, to the page, items for sale that the user likes.

13. The method of claim 7, further comprising determining that the plurality of physical retailer locations are within a threshold distance to the user device or user based at least in part on receiving the geocoded indicator transmitted by the user device based on the establishing a communication session with the user device and responsively determining which inventory facilities offer the item for sale that is within the threshold distance from the geocoded indicator.

* * * * *